United States Patent Office 3,402,996
Patented Sept. 24, 1968

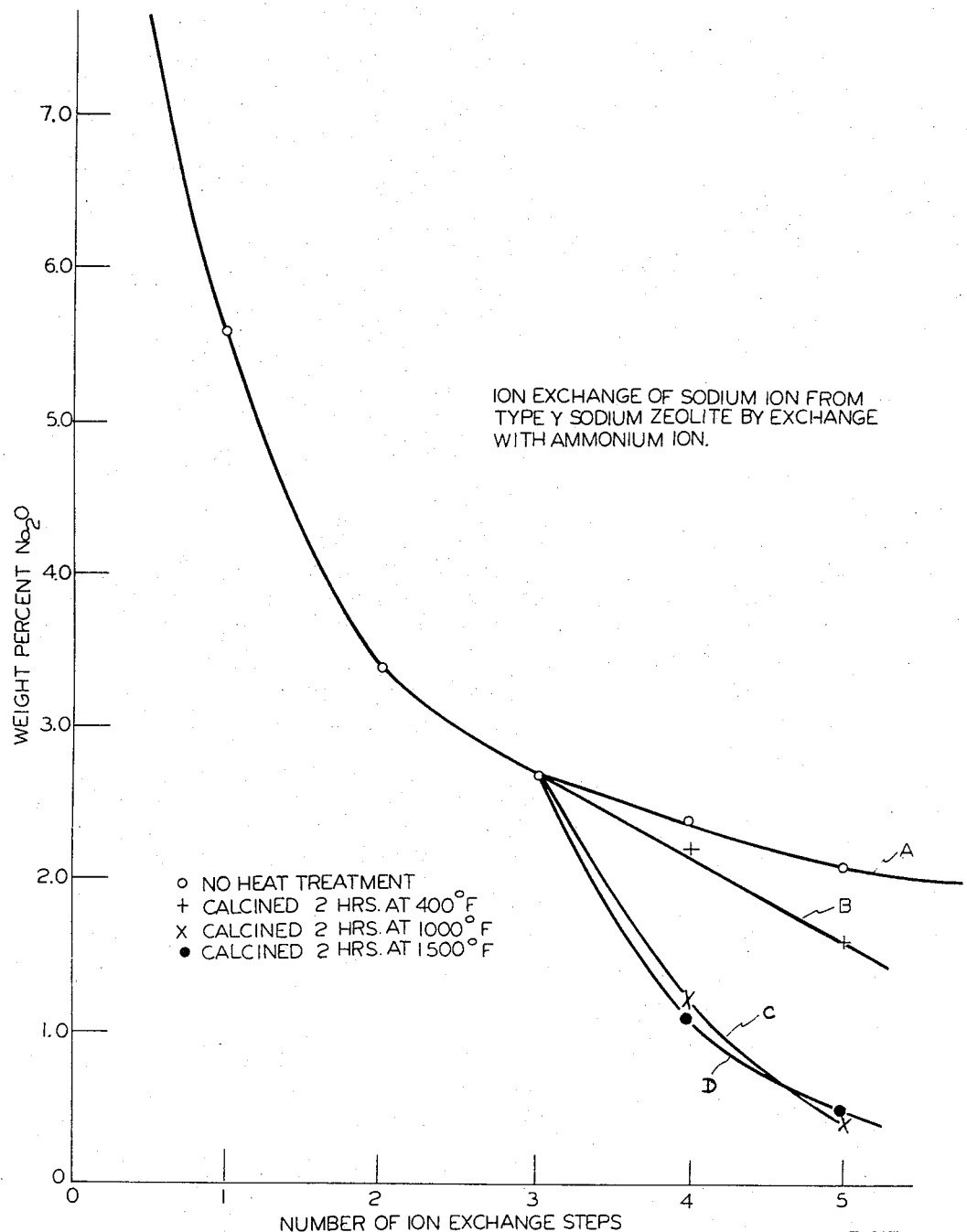

3,402,996
ION EXCHANGE OF CRYSTALLINE ZEOLITES
Philip K. Maher, Baltimore, and Carl V. McDaniel, Laurel, Md., assignors to W. R. Grace & Co., New York, N.Y., a corporation of Connecticut
Continuation-in-part of application Ser. No. 481,669, Aug. 23, 1965. This application Dec. 19, 1966, Ser. No. 602,766
10 Claims. (Cl. 23—112)

ABSTRACT OF THE DISCLOSURE

Method of cation exchanging zeolites comprising a conventional ion exchange step, whereby the more easily exchangeable cations are ion exchanged, followed by a calcination step at 400 to 1500° F., whereby the difficult to exchange cations are redistributed, the redistributed cations are then ion exchanged by an additional conventional ion exchange step. One or more calcinations and additional ion exchange steps may be used. This method is particularly applicable to the ion exchange removal of sodium ions from crystalline zeolites.

---

This application is a continuation-in-part of application Ser. No. 481,669, filed Aug. 23, 1965, now U.S. Patent 3,293,192.

This invention relates to a new and unobvious method of zeolite cation exchange whereby essentially 100 percent of the mobile cations are exchanged. In particular, the method of this invention comprises an initial ion exchange step whereby the more easily exchangeable cations are ion exchanged followed by a heat treatment to provide the necessary activation energy for the redistribution of the remaining locked in cations, and a final ion exchange step whereby the redistributed cations are exchanged.

The crystalline aluminosilicate zeolites are of general interest because of their selective adsorption properties and extremely high catalytic activity for certain acid-type catalyzed reactions. It has been estimated that their catalytic activity is often of the order of 1000 times that of conventional amorphous aluminosilicate catalysts. The use of crystalline aluminosilicate zeolites is of particular interest in the field of hydrocarbon cracking. It is further particularly important in the hydrocarbon industry that the zeolite does not contain cations such as sodium since even as little as 1% by weight sodium will prevent the zeolite catalyst from having the thermal stability required to prevent crystal collapse during normal hydrocarbon cracking and catalyst regeneration.

The catalytic behavior of the zeolites is very dependent on the nature of the cation present, the most active being those containing polyvalent ions or protons. Most of the fundamental work that has been reported has been restricted to zeolites containing monovalent cations and in particular the alkali metal cations. This is largely due to the fact that zeolites are generally synthesized in these forms. The prior art has had considerable difficulty in attempting to cation exchange these alkali metal cations completely for polyvalent cations.

Chemically the zeolites may be represented by the general formula:

$$M_{2n}O:Al_2O_3:xSiO_2:yH_2O$$

where M is a cation and $n$ is its valence. Wherein $x$ is normally in the range of 1.0 to 15 and $y$ is a function of the degree of dehydration.

The structure of a number of the zeolites has been shown to be based on units consisting of tetrahedra of silica and alumina, which in turn are connected to form a cubo-octahedral unit similar to that found in the natural mineral sodalite. A variation in stacking or combination of these octahedral units will lead to a variety of zeolites, one typical such structure being the zeolite faujasite. The faujasite structure consists of a diamond type lattice of the cubo-octahedral units joined by pairs of 6 membered oxygen rings. Faujasite has a well-ordered structure having all the aluminum atoms tetrahedrally coordinated with oxygen and having one excess negative charge for each aluminum atom in the lattice. This charge is electrically balanced by the presence of a cation that has a great degree of mobility. This cation may be exchanged with other cations and it is the exchange of this cation that we are primarily concerned with in this invention.

In general, the mechanism of ion exchanging zeolites is the same as for the organic exchangers and may be considered as a Donnan membrane type equilibrium. The zeolite system does, however, save some basic differences from the crosslinked organic exchangers. For example, the relatively rigid structural framework of the crystalline zeolite does not permit the large degree of osmotic type swelling encountered in the non-crystalline organic exchangers. Also, the more ordered nature of the crystalline materials results in a discrete number of types of exchange sites, whereas in the organic exchangers a continuum of site-types probably exists.

It has been observed in many of the zeolites and particularly in the sodium Y type faujasite that only about 85 percent of the sodium ions are readily accessible for ion exchange by conventional ion exchange techniques. An exception to this is the exchange by silver ions where the silver ion is apparently small enough and selective enough to readily replace sodium and other ions even in the inaccessible sites. The problem of effecting essentially complete cation exchange is further discussed in an article by Howard S. Sherry in the Jr. of Phys. Chem., vol. 70, No. 4, April 1966, pp. 1158–1168.

The ion exchange technique in our invention resides in an initial exchange of the more easily removable ions, followed by a heat treatment which provides the necessary activation energy for the redistribution of the remaining locked in ions. The redistributed ions are thus made easily accessible for exchange by a second ion exchange step. The ion exchange technique of this invention is applicable to the ion exchange of any crystalline zeolite especially those having difficult to exchange cations. Examples of these zeolites include the zeolite designated by the Linde Division of Union Carbide Corporation by the letters X, Y, A, L (these zeolites are described in U.S. Patents Nos. 2,882,244, 3,130,007, 2,882,243 and Belgium Patent No. 575,117, respectively), as well as the naturally occurring crystalline zeolites, chabazite, erionite, faujasite, mordenite, sodalite, etc. Any exchangeable cation may be used, for example, ammonium ion and cations of the rare earth metals and Groups II–A, III–A and VIII of the Periodic Table.

The drawing illustrates the ion exchange removal of sodium ion from type Y sodium zeolite by the method of this invention and by conventional ion exchange.

In carrying out our process, the zeolite, normally in the sodium form, is exchanged with a salt solution of the particular cation desired to be exchanged. The concentration of the salt solution and the particular anion are not critical. Any of the soluble inorganic salts such as, for example, chloride sulfate or nitrate, etc., may be used, as as well as the organic salts, such as acetate and formate. The exchange is carried out by mixing an excess of the salt solution with the zeolite for the proper period of time, normally 5 minutes to 5 hours.

The rate of exchange can be increased by carrying out the exchange at an elevated temperature. Obviously, the exchange temperature of the solution must be below the atmosphere boiling point of the solution, unless pressure equipment is used. Suitable exchange may be carried out at temperatures of from about 25° C. to 95° C. The excess salt solution is then removed from contact with the zeolite after a suitable period of time, for example, 5 minutes to 5 hours. The time of contact between the cation exchange solution and the zeolite is such as to effectively replace the easily exchangeable cations in the aluminosilicate to about 3 percent calculated as the oxide of the cation, for example, $Na_2O$.

In the second step of our process, the exchanged zeolite is washed to remove any excess salts. This washing is a conventional step and is normally carried out with deionized water.

After the washing step, the zeolite, now partially exchanged with the cation desired and having 10 to 20 percent of the original cations remaining (depending on the particular zeolite) is dried and heat treated to redistribute the locked in cations. The heat treatment is normally carried out at a temperature of 400 to 1500° F., preferably about 600 to 1200° F. However, the temperature must be low enough so as not to cause the zeolite crystalline structure to collapse, since some of the zeolites in the low initial cations condition enter into what is known as a metastable condition, wherein the crystalline structure will collapse when subjected to thermal treatment. The duration of the heat treatment is dependent upon the temperature, e.g., a lower heat treatment duration will require a higher temperature. Suitable results are obtained when the heat tratment is carried out at a temperature of about 1000° F. for periods of 0.10 hour to 3 hours.

In the final step of our process, the zeolite is cooled to room temperature and a final exchange carried out to reduce the initial cation content to the desired level. The heat treament step has unlocked the locked initial cations (normally alkali cations) and thus an almost 100 percent removal of the initial cations may be effected. This final exchange may be carried out with any suitable salt solution dependent upon the cation desired in the exchanged zeolite. Examples of suitable salt solutions are ammonium salt solutions, rare earths and alkali earth metal salts, such as calcium, magnesium, etc. The zeolite is then given a final wash and dried. Prior to actual use, the zeolite is normally calcined to activate it by removing the water molecules. Such calcination is conventional and may, for example, be carried out at 700° F. to 1000° F. for 3 hours.

The process is, of course, capable of modification, for example, the heating (to redistribute the locked in cations) and the ion exchange step may be carried out as a series of repeating cycles.

The following examples are merely illustrative of the ion exchange process of this invention and are not in any way intended to be limiting thereof. (All percentages are weight percentages unless otherwise indicated and in each example, a crystalline zeolite was used.)

Example I

Several runs were made in which the starting material was a Z-14HS (type Y) Na zeolite containing about 13% $Na_2O$. This material had a surface area after calcination at 700° F. of 942 square meters per gram. The unit cell size was 24.65 Angstroms.

A quantity of this material was treated with an ammonium sulfate-water solution. The treating slurry consisted of 20 pounds of the zeolite, 30 pounds of ammonium sulfate, and 150 pounds of water. This treatment was carried out for a period of one hour. At the end of this time, the product was removed, washed and the sodium content of the product determined. The composition had a $Na_2O$ content of 4.15 weight percent. This composition was again washed with ammonium sulfate solution in the same proportions as used in the first treatment. At this point, the exchange was carried out at a temperature of 100° C. for a period of two hours. The product was filtered, washed and the sodium oxide content of the product determined. The product was found to have a $Na_2O$ content of 2.2 weight percent.

This product was washed thoroughly to remove sulfate and calcined at 1000° F. for two hours. After the calcination, the product was cooled to room temperature and subjected to another ammonium sulfate exchange step. In this exchange, 4.17 pounds of the zeolite were mixed with 12½ pounds of ammonium sulfate and 250 pounds of water. The exchange was continued at a temperature of 100° C. for a period of 3 hours. At the end of this time, the $Na_2O$ content of the product had decreased to 0.55 weight percent.

The exchange treatment was repeated using the same ratio of reactants as the previous exchange. The exchange was carried out for a period of one hour at a temperature of 100° C. At the end of this time, the product was sampled and the $Na_2O$ content determined. It was found that the $Na_2O$ content of the product was 0.32 weight percent $Na_2O$. The product was then calcined for 3 hours at 1500° F. The surface area of this material as determined by the well-known Brunauer-Emmett-Teller method (S. Brunauer, P. Emmett and E. Teller, J. Am. Chem. Soc. 60, 309 (1938)), was 438 square meters per gram. The unit cell of this material was 24.29 Angstroms.

Example II

Another sample of the starting material of Example II was treated as in Example I. The treatment prior to the first calcination at 1000° F. was identical to the product of Example I. The product had a $Na_2O$ content of 2.2 weight percent.

The product was washed thoroughly to remove sulfate and calcined at 1000° F. for 2 hours. After the calcination the product was again exchanged with ammonium sulfate. In this exchange 4.17 pounds of zeolite, 12.5 pounds of ammonium sulfate and 250 pounds of water were stirred together for a period of 3 hours at a temperature of 100° C. The exchange was repeated as in Example I using the same ratio of reactants. The second exchange was continued at 100° C. for a period of one hour.

After the second exchange, the $Na_2O$ content of the product was found to be 0.093 weight percent. The product was then calcined for 4 hours at 1500° F. The unit cell size of the product was 24.309 Angstroms.

The improved stability was demonstrated by calcining a portion of this product at a temperature of 1800° F. and determining the surface area after calcination. The surface area was found to be 378 square meters per gram.

Example III

Three additional runs were made to determine whether the preliminary exchange would give a satisfactory product when the exchange was carried out for a period of one hour.

In this run, the starting material was the same starting material as in Example I. The Z-14HS (type Y) Na composition had a $Na_2O$ content of 13%, a surface area of 700 square meters per gram and a unit cell size of 24.653 Angstroms. This material was exchanged with ammonium sulfate by mixing 20 pounds of the zeolite, 30 pounds of ammonium sulfate and 150 pounds of water at a temperature of 100° C. for a period of one hour. When the $Na_2O$ content of a sample of this material was determined, it was found to be 4.25 weight percent.

This composition was subjected to a second exchange using the same quantity of reactants. The exchange was again carried out for a period of one hour at a temperature of 100° C. At the end of this treatment, a sample of the composition was analyzed and found to contain 2.56 weight percent $Na_2O$. This product was then washed thoroughly to remove sulfate and calcined for 4 hours at 1000° F. The calcined product was again exchanged as in Examples I and II. Exchange was carried out by mixing 4.17 pounds of the zeolite, 12.5 pounds of ammonium sulfate and 250 pounds of water for a period of 3 hours at a temperature of 100° C. The sodium content after this third exchange is set out in the table below. This material was subjected to a fourth exchange using the same conditions and followed by calcination for a period of 4 hours at a temperature of 1500° F.

TABLE I

| Run | 1 | 2 | 3 |
|---|---|---|---|
| $Na_2O$ content after 3rd exchange in wt. percent | 0.23 | 0.21 | 0.18 |
| $Na_2O$ content after 4th exchange in wt. percent | 0.11 | 0.105 | 0.19 |
| PROPERTIES AFTER FINAL CALCINATION | | | |
| Unit cell size in A. of finished product | 24.287 | 24.299 | 24.329 |
| Surface area in m.²/g. after calcination at 1,725° C | 460 | 571 | 535 |
| Surface area after calcination at 1,900° F. in m.²/g | 287 | 309 | 244 |

The surface area after calcination at 1900° F. proved the extreme thermal stability of this product. Stability of this order would have been impossible without essentially complete removal of the sodium ion.

Example IV

This example illustrates a conventional cation exchange of a type Y sodium zeolite with a magnesium ion.

A 20% magnesium sulfate solution was made by dissolving 1 pound of $MgSO_4 \cdot 7H_2O$ crystals into 1800 ml. of deionized water. 300 grams of Z-14HS (type Y) sodium zeolite (about 13% $Na_2O$) were slurried with 500 ml. of the magnesium sulfate solution. The slurry was heated to 100° C. in a resin kettle equipped with a condenser column to retard evaporation. This treatment was effected for approximately 1 hour with samples of the zeolite being taken after 15 minutes, ½ hour and 1 hour and analyzed for sodium ion content to insure that ion exchange equilibrium had been reached. The analysis of these samples were as follows:

$Na_2O$
15 minutes treatment _____ 8.0
30 minutes treatment _____ 7.9
1 hour treatment _____ 8.6
Average sodium ion content _____ 8.2

After this ion exchange treatment, the solution was filtered off from the slurry and the remaining zeolite was again ion exchanged by treatment with 500 ml. of the fresh magnesium sulfate solution in the same manner as the first ion exchange. Samples and analysis were again made after 15 minutes of treatment, ½ hour of treatment and 1 hour of treatment as with the first ion exchange treatment. The results of these analyses showed:

$Na_2O$
15 minutes treatment _____ 6.5
½ hour treatment _____ 5.9
1 hour treatment _____ 6.3
Average sodium ion content _____ 6.2

The solution was again filtered off and the remaining zeolite was again ion exchanged with 500 ml. of the fresh magnesium sulfate solution as in the previous ion exchange steps. Samples were again taken and analysis made as with the previous ion exchanges. The results of these analyses showed:

$Na_2O$
15 minutes treatment _____ 5.1
½ hour treatment _____ 5.8
1 hour treatment _____ 5.2
Average sodium ion content _____ 5.4

All of the above samples were filtered and the zeolite filter cake washed with deionized water, dried at 110° F. for about 15 minutes and then calcined at 1000° F. to remove excess water, before being analyzed for sodium ion.

As may be seen from this example, each subsequent conventional ion exchange step is less effective than the previous ion exchange step in removing sodium ion. A curve of $Na_2O$ content number of exchanges would show that the $Na_2O$ content would level off at about 5 percent regardless of the number of conventional ion exchanges.

Example V

This example illustrates the method according to our invention of cation exchanging Z-14HS (type Y) sodium zeolite with magnesium cation.

A 9% magnesium sulfate solution was made by dissolving 50 grams of magnesium sulfate in 500 grams of water. 50 grams of Z-14HS sodium zeolite (about 13% by wt. $Na_2O$) was slurried into this solution and allowed to stand 16 hours at room temperature. The slurry was then filtered and the filter cake washed with deionized water, dried, and then *calcined* at 1000° F. for 2 hours. An analysis of this material showed a $Na_2O$ content of 5.7% by weight. 10 grams of the calcined material was then slurried with a solution of 500 ml. of water and 50 grams of $MgSO_4$, and allowed to stand overnight. This slurry was then filtered and the filter cake washed with deionized water, dried, and then *calcined* at 1000° F. for 1 hour. An analysis of a sample of this material showed a $Na_2O$ content of 3.8% by weight. After the second calcination, the material was then given a third ion exchange treatment by slurrying with a solution of 50 grams of $MgSO_4$ and 500 ml. of water and allowing it to stand for 12 hours. The slurry was then filtered and the filter cake washed with deionized water, dried at 110° C. and calcined for 2 hours at 1000° F. An analysis showed that the sodium ion content had been reduced to 1.51% by weight $Na_2O$. Thus, it may be seen that the ion exchange method of this invention is effective in removing sodium ions to a level greatly beyond the level which may be obtained by conventional ion exchange methods.

Example VI

This example illustrates the method according to our invention of cation exchanging Z-14HS (type Y) sodium zeolite with rare earth metal.

A 9% rare earth chloride solution was made by dissolving 50 grams of rare earth chloride in 500 grams of water. 50 grams of Z-14HS sodium zeolite (about 13% by weight $Na_2O$) was slurried into this solution and allowed to stand 16 hours at room temperature. The slurry was then filtered and the filter cake washed with deionized water, dried, and then *calcined* at 1000° F. for 2 hours. An analysis of this material showed a $Na_2O$ content of 3.8% by weight. 20 grams of the calcined material was then slurried with a solution of 500 ml. of water and 50 grams of rare earth chloride and allowed to stand overnight. This slurry was then filtered and the filter cake washed with deionized water, dried, and then *calcined* at 1000° F. for 1 hour. An analysis of a sample of this material showed a $Na_2O$ content of 1.2% by weight. The remaining material was then given a third ion exchange treatment by slurrying with a solution of 50 grams of rare earth chloride and 500 ml. of water and allowing it to stand for 12 hours. The slurry was then filtered and the filter cake washed with deionized water, dried at 110° C. and calcined for 2 hours at 1000° F. An analysis showed that the sodium ion content had been reduced to 0.26% by weight $Na_2O$.

Example VII

This example illustrates a modified process according to our invention wherein a type X sodium zeolite (about 13 percent $Na_2O$ by weight) is first cation exchanged with a rare earth cation, then calcined and cation exchanged with ammonium cation. Thus, illustrating different cations may be used in effecting our inventive method.

A slurry of about 50 percent water and 50 percent type X sodium zeolite (about 19% $Na_2O$) treated in a solution of mixed rare earth chlorides at a temperature of about 95° C. for a period of 15 minutes. The ratio of molecular sieve to rare earth chloride to water in the mixture weight basis was 1 to 0.5:5. After the mixture had been stirred for about 15 minutes, the solution was removed by filtration and the molecular sieve portion was treated with a fresh solution of mixed rare earth chloride. The solution was heated to a temperature of 95° C. This temperature was maintained during the balance of the exchange for a period of about 15 minutes. The solution used in this second exchange contained twice as much rare earth chlorides and water so that the ratio of molecular sieve to rare earth chloride to water was 1 to 1 to 10. The solution was removed from the molecular sieve by filtration and the product was washed free of chloride ion, and calcined at a temperature of 1000° C. for a period of 2 hours. The product contained 2.5% $Na_2O$ at this stage. After calcination, the product was treated with an ammonium sulfate solution heated to 95° C. for a period of 15 minutes. The ratio of molecular sieve to ammonium sulfate to water on a weight basis was 1 to 1 to 20. After this treatment, the solution was removed by filtration and the ammonium sulfate treatment repeated. After the second treatment, the product was washed free of sulfate ion and dried. The product recovered had the following properties:

Sodium content, $Na_2O$—0.36%.

Example VIII

This example illustrates the comparison between conventional ion exchanging and ion exchanging by our invention.

In this example, 100 grams of type Y sodium zeolite was slurried with an ammonium sulfate solution; the ratio of zeolite to ammonium sulfate to water used was 1:0.5:20. The exchange was carried out for one hour at a temperature near (below) the boiling point of the solution. The solution was then filtered off and a sample of the zeolite taken and analyzed for $Na_2O$. This procedure was then repeated twice more using fresh solution for each additional exchange. In order to illustrate the difference between treatment by conventoinal ion exchange and by our invention, the zeolite was then divided into four equal portions (A, B, C, D) and each portion treated as follows:

A. Conventional ion exchange.—This portion was given two additional ion exchange treatments with fresh ammonium sulfate solution with the same ratio and in the same manner as the previous exchanges.

B. Portion B was calcined for 2 hours at 400° F. and then ion exchanged twice with fresh ammonium sulfate solutions in exactly the same manner as portion A.

C. Portion C was calcined for 2 hours at 1000° F. and then ion exchanged twice with fresh ammonium sulfate solutions in exactly the same manner as portion A.

D. Portion D was calcined for 2 hours at 1500° F. and then ion exchanged twice with fresh ammonium sulfate solutions in exactly the same manner as portion A.

Each portion was thus subjected to a total of five ion exchanges (3 before apportionment and 2 after). After each exchange 1 gram zeolite samples were taken and analyzed for $Na_2O$. The results are summarized below in Table II.

TABLE II

| Ion exchange number | Weight percent $Na_2O$ | | | |
|---|---|---|---|---|
| | A | B | C | D |
| 0 | 12.9 | 12.9 | 12.9 | 12.9 |
| 1 | 5.6 | 5.6 | 5.6 | 5.6 |
| 2 | 3.4 | 3.4 | 3.4 | 3.4 |
| 3 | 2.7 | 2.7 | 2.7 | 2.7 |
| 4 | 2.4 | 2.2 | 1.2 | 1.1 |
| 5 | 2.1 | 1.6 | 0.4 | 0.5 |

To further illustrate the vast improvement of our invention, these results were plotted in the drawing. As may be seen from the drawing, the minimum $Na_2O$ percent which may be obtained by conventional methods levels off around 2% while by our method the $Na_2O$ content may be reduced to below 0.5%. The drawing further illustrates that while an advantage will be obtained by heat treatment at a temperature as low as 400° F. that a considerably greater advantage will be achieved if the heat treatment is carried out at a temperature of 1000° F. and further that no appreciably, if any, advantage is gained over the 1000° F. heat treatment by heat treating at 1500° F.

Obviously many variations and modifications may be made without departing from the essence of our invention and only such limitations as are recited in the appended claims should be applied.

What is claimed is:

1. A process of cation exchanging crystalline zeolite aluminosilicates, including exchanging locked-in cations comprising:
    (a) Exchanging the zeolite with a solution of a salt of at least one desired metal cation to an original cation content of less than 3–4% by weight,
    (b) Washing to remove excess salts,
    (c) Drying and heating the exchanged zeolite at a temperature of 400 to 1500° F. to redistribute the locked-in cations for easy exchange,
    (d) Cooling the calcined zeolite and reducing the original cation content by a second ion exchange,
    (e) Washing, drying and recovering the product.

2. The process of claim 1 wherein the original cation is an alkali metal cation.

3. The process of claim 1 wherein the redistribution heating step and cation exchange step is effected as a series of alternating calcination and cation exchange steps.

4. The process of claim 1 wherein different cations are used for the cation exchange step preceeding the redistribution heating step and the cation exchange step following the redistribution heating step.

5. The process of claim 1 wherein the desired cation is a polyvalent cation.

6. The process of claim 1 wherein the desired cation is bivalent.

7. The process of claim 1 wherein the zeolite is a zeolite from the group consisting of type Y, type X and type A.

8. The process of claim 1 wherein the temperature of the ion exchange solutions is from 50 to 90° C.

9. The process of claim 1 wherein the drying and heating temperature is between 800–1200° F.

10. The process of claim 2 wherein the desired metal cation is a rare earth metal cation.

References Cited

UNITED STATES PATENTS

| 3,130,006 | 4/1964 | Rabo et al. | 23—110 |
| 3,236,761 | 2/1966 | Rabo et al. | 208—111 |
| 3,293,192 | 12/1966 | Maher et al. | 23—112 X |

OSCAR R. VERTIZ, *Primary Examiner.*

EDWARD J. MEROS, *Assistant Examiner.*

Notice of Adverse Decision in Interference

In Interference No. 97,234 involving Patent No. 3,402,996, P. K. Maher and C. V. McDaniel, ION EXCHANGE OF CRYSTALLINE ZEOLITES, final judgment adverse to the patentees was rendered Sept. 11, 1974, as to claim 4.

[*Official Gazette February 18, 1975.*]